United States Patent
Xu et al.

(10) Patent No.: US 11,203,991 B2
(45) Date of Patent: Dec. 21, 2021

(54) GAS CONTROL SYSTEM AND GAS CONTROL METHOD OF OFF-ROAD GAS ENGINE

(71) Applicant: Weichai Power Co., Ltd., Shandong (CN)

(72) Inventors: Shuaiqing Xu, Shandong (CN); Xuebin Wang, Shandong (CN); Feng Xie, Shandong (CN); Wang Li, Shandong (CN)

(73) Assignee: Weichai Power Co., Ltd., Shandong (CN)

( * ) Notice: Subject to any disclaimer, the term of this patent is extended or adjusted under 35 U.S.C. 154(b) by 0 days.

(21) Appl. No.: 16/765,576

(22) PCT Filed: Jun. 29, 2018

(86) PCT No.: PCT/CN2018/093799
§ 371 (c)(1),
(2) Date: May 20, 2020

(87) PCT Pub. No.: WO2020/000416
PCT Pub. Date: Jan. 2, 2020

(65) Prior Publication Data
US 2020/0309050 A1 Oct. 1, 2020

(51) Int. Cl.
*F02D 41/00* (2006.01)
*F02M 21/02* (2006.01)
*F02M 21/04* (2006.01)

(52) U.S. Cl.
CPC ..... *F02D 41/0027* (2013.01); *F02M 21/0239* (2013.01); *F02D 2200/0602* (2013.01);
(Continued)

(58) Field of Classification Search
CPC ........... F02M 21/0239; F02M 21/0215; F02M 21/0284; F02M 21/047; F02M 21/02;
(Continued)

(56) References Cited

U.S. PATENT DOCUMENTS 5,070,851 A * 12/1991 Janisch ................ F02M 21/047
123/527
5,245,977 A * 9/1993 Chen ..................... B01F 5/0415
123/590

(Continued)

FOREIGN PATENT DOCUMENTS

BE 442633 A 10/1941
CN 2656652 Y 11/2004
(Continued)

OTHER PUBLICATIONS

International Search Report dated Mar. 27, 2019 received in International Application No. PCT/CN2018/093799.
(Continued)

*Primary Examiner* — Phutthiwat Wongwian
*Assistant Examiner* — Sherman D Manley
(74) *Attorney, Agent, or Firm* — Scully Scott Murphy & Presser

(57) ABSTRACT

A gas control system of a non-road gas engine and a gas control method thereof are disclosed by the present disclosure. The gas control system includes a mixer, the mixer is provided with an air inlet, a gas inlet and a mixed gas outlet respectively, the air inlet is provided with a first pressure sensor, the gas inlet is provided with a second pressure sensor and a pressure regulating valve that are spaced apart, and the mixed gas outlet is provided with a third pressure sensor; the first pressure sensor, the second pressure sensor, the pressure regulating valve and the third pressure sensor are respectively electrically connected to a controller, and
(Continued)

the controller controls an opening degree of the pressure regulating valve according to pressure information fed back by the first pressure sensor, the second pressure sensor and the third pressure sensor so as to adjust an air-gas ratio of the mixed gas. The system has a simple structure. By disposing a pressure regulating valve at the gas inlet, the pressure of the gas entering the mixer is controlled, and the air-gas ratios required under various working conditions are controlled, which realizes a closed-loop control so that a control range of the air-gas ratio is smaller, the accuracy is higher, and a transient response speed of the engine is improved.

9 Claims, 2 Drawing Sheets

(52) U.S. Cl.
CPC ..... *F02M 21/0215* (2013.01); *F02M 21/0284* (2013.01); *F02M 21/047* (2013.01)

(58) Field of Classification Search
CPC ............... F02M 21/04; F02M 21/0218; F02D 41/0027; F02D 2200/0602; F02D 2200/0406; F02D 19/023; F02D 19/022; F02D 19/027; G05D 11/131; Y02T 10/30
See application file for complete search history.

(56) References Cited

U.S. PATENT DOCUMENTS

| | | | | |
|---|---|---|---|---|
| 6,932,052 | B1* | 8/2005 | Fulton | F02D 19/023 123/344 |
| 7,958,866 | B2* | 6/2011 | Thomas | F02D 41/0027 123/379 |
| 8,176,897 | B1* | 5/2012 | Guglielmo | F02M 21/0239 123/458 |
| 8,286,611 | B1* | 10/2012 | Guglielmo | F02M 21/0239 123/458 |
| 9,181,901 | B2* | 11/2015 | Dasappa | F02M 13/08 |
| 9,581,089 | B2* | 2/2017 | Sarmiento Penuela | F02C 9/50 |
| 9,624,863 | B1* | 4/2017 | Ge | F02D 33/003 |
| 2004/0089279 | A1* | 5/2004 | McLaughlin | F02D 41/0027 123/688 |
| 2005/0011501 | A1* | 1/2005 | Shetley | F02D 19/066 123/549 |
| 2009/0088950 | A1* | 4/2009 | Fisher | F02D 35/0076 701/103 |
| 2016/0017845 | A1* | 1/2016 | Huang | F02B 39/04 290/1 A |
| 2018/0057760 | A1* | 3/2018 | Chandran | C10J 3/10 |
| 2019/0101068 | A1* | 4/2019 | Wallengren | F02D 19/024 |
| 2019/0293028 | A1* | 9/2019 | Jeon | F02D 41/0027 |
| 2020/0025156 | A1* | 1/2020 | Mizushima | F02M 25/0836 |
| 2021/0003060 | A1* | 1/2021 | Srinivasan | F01N 9/00 |

FOREIGN PATENT DOCUMENTS

| | | |
|---|---|---|
| CN | 102230425 A | 11/2011 |
| CN | 202381174 U | 8/2012 |
| CN | 104121115 A | 10/2014 |
| CN | 203978644 U | 12/2014 |
| CN | 104728479 A | 6/2015 |
| CN | 106677909 A | 5/2017 |
| DE | 10 2007 011 312 A1 | 9/2008 |
| DE | 10 2016 115 113 A1 | 2/2018 |
| EP | 0 545 121 A1 | 6/1993 |
| EP | 0 690 215 B1 | 12/2002 |
| JP | 2000-146263 A | 5/2000 |
| JP | 4452092 B2 | 4/2010 |

OTHER PUBLICATIONS

First Office Action dated Oct. 23, 2020 received in Chinese Patent Application No. CN 201880012904.2 together with an English language translation.
Extended European Search Report dated Feb. 9, 2021 received in European Paten Application No. EP 18924783.6.

* cited by examiner

GAS CONTROL SYSTEM AND GAS CONTROL METHOD OF OFF-ROAD GAS ENGINE

TECHNICAL FIELD

The present disclosure relates to the technical field of automobile control, and in particular to a gas control system for a non-road gas engine, and a gas control method for a non-road gas engine including the above gas control system.

BACKGROUND

In gas engines, liquefied petroleum gas (LPG), natural gas, biomass gas and the like are mainly used as fuel. The main products after combustion are $CO_2$, NOx and other gases, which cause little pollution to the environment and have been widely used as clean energy in many countries. The performance of gas engine depends largely on the gas supplied by a gas supply system and the quality of the mixed gas, and a mixer in the gas supply system has an important influence on the performance of the engine.

At present, the mixers used in non-road gas engines in the related art mainly include a venturi mixer and a proportional mixer, wherein in the venturi mixer, a static pressure at a throat section is mainly utilized to inhale the gas for mixing, but such a mixer not only needs to achieve uniform mixing of the gas and air by designing relevant sizes at the throat, but also needs to control flow rates at both an air inlet and an air outlet, thus making the control accuracy be low and the control be difficult; whereas in the proportional mixer, a pressure difference between the air and gas and an intake duct is utilized to adjust an opening degree of an inner core so as to control an air-gas (i.e. fuel gas) ratio of the mixed gas, but a control range of this structure is not small enough, and the response speed is slow.

SUMMARY

The object of the present disclosure is to solve at least one of the above problems, and the object is achieved by the following technical solutions.

The present disclosure provides a gas control system for a non-road gas engine, which includes a mixer, wherein the mixer is provided with an air inlet, a gas inlet and a mixed gas outlet respectively, the air inlet is provided with a first pressure sensor, the gas inlet is provided with a second pressure sensor and a pressure regulating valve that are spaced apart, and the mixed gas outlet is provided with a third pressure sensor; and the first pressure sensor, the second pressure sensor, the pressure regulating valve and the third pressure sensor are respectively electrically connected to a controller, and the controller controls an opening degree of the pressure regulating valve according to pressure information fed back by the first pressure sensor, the second pressure sensor and the third pressure sensor so as to adjust an air-gas ratio of the mixed gas.

In addition, the second pressure sensor is located between the gas inlet and the pressure regulating valve.

In addition, the mixer is provided therein with a gas passage, an air passage, a pressure transmission passage, a mixing chamber and a working chamber, wherein the gas passage is in communication with the gas inlet and the mixing chamber respectively, the air passage is in communication with the air inlet and the mixing chamber respectively, one end of the mixing chamber is in communication with the mixed gas outlet, and the other end of the mixing chamber is in communication with the working chamber via the pressure transmission passage; and the pressure transmission passage is capable of transmitting a pressure difference at the mixed gas outlet to the working chamber, wherein a movement of the working chamber enables the air inlet and the gas inlet to be opened so that gas and air are drawn into the mixing chamber.

In addition, the mixer includes an inner core having an open end facing the mixed gas outlet, wherein the open end is internally provided with a guide post which is coaxially disposed with the inner core, the guide post is coaxially inserted into a gas pipe, and the gas pipe is spaced apart from an outer wall of the guide post and an inner wall of the inner core respectively to form the gas passage.

In addition, a sleeve is sleeved over the inner core, the sleeve is coaxially disposed with the inner core, a length of the sleeve is equal to a length of the inner core, and an inner wall of the sleeve is spaced apart from an outer wall of the inner core so that the pressure transmission passage is formed.

In addition, an end face of the sleeve away from the mixed gas outlet is connected with an upper cover through an elastic assembly, and the elastic assembly includes a diaphragm and a spring;

one end of the diaphragm is annularly connected to the end face of the sleeve away from the mixed gas outlet, the other end of the diaphragm is annularly connected to an end face of the upper cover, and the working chamber is formed by the sleeve, the diaphragm and the upper cover; and one end of the spring is fixedly connected to the upper cover, the other end of the spring is fixedly connected to the sleeve, and the spring is coaxially disposed with the sleeve.

In addition, a casing is sleeved over an outer portion of the sleeve, the casing is coaxially disposed with the sleeve, and an inner wall of the casing is spaced apart from an outer wall of the sleeve so that the air passage is formed; and a length of the casing is greater than a length of the inner core, the mixed gas outlet is disposed at a port of the casing away from the inner core, and the mixing chamber is located between the inner core and the mixed gas outlet.

The present disclosure also provides a gas control method for a non-road gas engine, which is implemented by the above described gas control system and includes the following steps:

S1: generating a negative pressure and transmitting the negative pressure to the working chamber;

S2: driving the working chamber to move so that the air inlet and the gas inlet are opened respectively;

S3: collecting current pressures at the gas inlet, the air inlet and the mixed gas outlet respectively;

S4: calculating a current gas flow rate according to a gas density, the current pressure of the gas, and parameters of the gas passage;

S5: calculating a current air flow rate according to an air density, the current pressure of the air, and parameters of the air passage;

S6: calculating a current air-gas ratio according to the current air flow rate and the current gas flow rate, and determining whether the current air-gas ratio is the same as the air-gas ratio under actual working condition; if yes, maintaining the current state; and if no, proceeding to S7;

S7: determining a currently required gas pressure according to the air-gas ratio under actual working condition; and S8: controlling an opening degree of the pressure regulating valve according to the currently required gas pressure.

In addition, in step S4, the current gas flow rate is calculated by the following formula:

$$Q_{gas} = C_{gas} \times L_{gas} \times h \times \sqrt{\frac{(P_{gas} - P_{mix})}{\rho_{gas}}}$$

where $Q_{gas}$ is the gas flow rate, $C_{gas}$ is a structural constant, $L_{gas}$ is a radial section circumference of the gas passage, h is an intake displacement, $P_{gas}$ is the current pressure of the gas, $P_{mix}$ is the current pressure of the mixed gas, and $\rho_{gas}$ is the gas density.

In step S5, the current air flow rate is calculated by the following formula:

$$Q_{air} = C_{air} \times L_{air} \times h \times \sqrt{\frac{(P_{air} - P_{mix})}{\rho_{air}}}$$

where $Q_{air}$ is the air flow rate, $C_{air}$ is a structural constant, $L_{air}$ is a radial section circumference of the air passage, h is an intake displacement, $P_{air}$ is the current pressure of the air, $P_{mix}$ is the current pressure of the mixed gas, and ρair is the air density.

In addition, in step S7, the current air-gas ratio is calculated by the following formula:

$$\frac{Q_{air}}{Q_{gas}} = \frac{C_{air} \times L_{air}}{C_{gas} \times L_{gas}} \times \sqrt{\frac{(P_{air} - P_{mix})}{\rho_{air}} \times \frac{\rho_{gas}}{(P_{gas} - P_{mix})}}$$

It can be derived that the pressure of the gas is calculated by the following formula:

$$P_{gas} = P_{mix} + \frac{\rho_{gas}(P_{air} - P_{mix})}{\rho_{air}\left(\frac{Q_{air}}{Q_{gas}} \times \frac{C_{gas} \times L_{gas}}{C_{air} \times L_{air}}\right)^2}$$

As compared with the related art, the gas control system and the gas control method for the non-road gas engine provided by the present disclosure have the following advantageous effects:

1. Under the premise that the current pressure of the air and the current pressure of the mixed gas are measured, the pressure of the gas entering the mixer is controlled by adjusting the pressure regulating valve disposed at the gas inlet, thereby controlling the air-gas ratios required under various working conditions and realizing a closed-loop control so that a control range of the air-gas ratio is smaller and the accuracy is higher.

2. The air-gas ratio of the mixer can be automatically adjusted according to a transient working condition of the engine to improve a transient response speed of the engine.

3. The structure is simple, and the manufacturing cost can be effectively reduced; at the same time, the performance is good, and the control accuracy is high.

BRIEF DESCRIPTION OF THE DRAWINGS

Upon reading the following detailed description of preferred embodiments, various other advantages and benefits will become apparent to those skilled in the art. The drawings are provided only for illustrating the preferred embodiments, and should not be construed as limiting the present disclosure. Identical components are denoted by identical reference signs throughout the drawings, wherein.

LIST OF REFERENCE SIGNS

Figure 1:
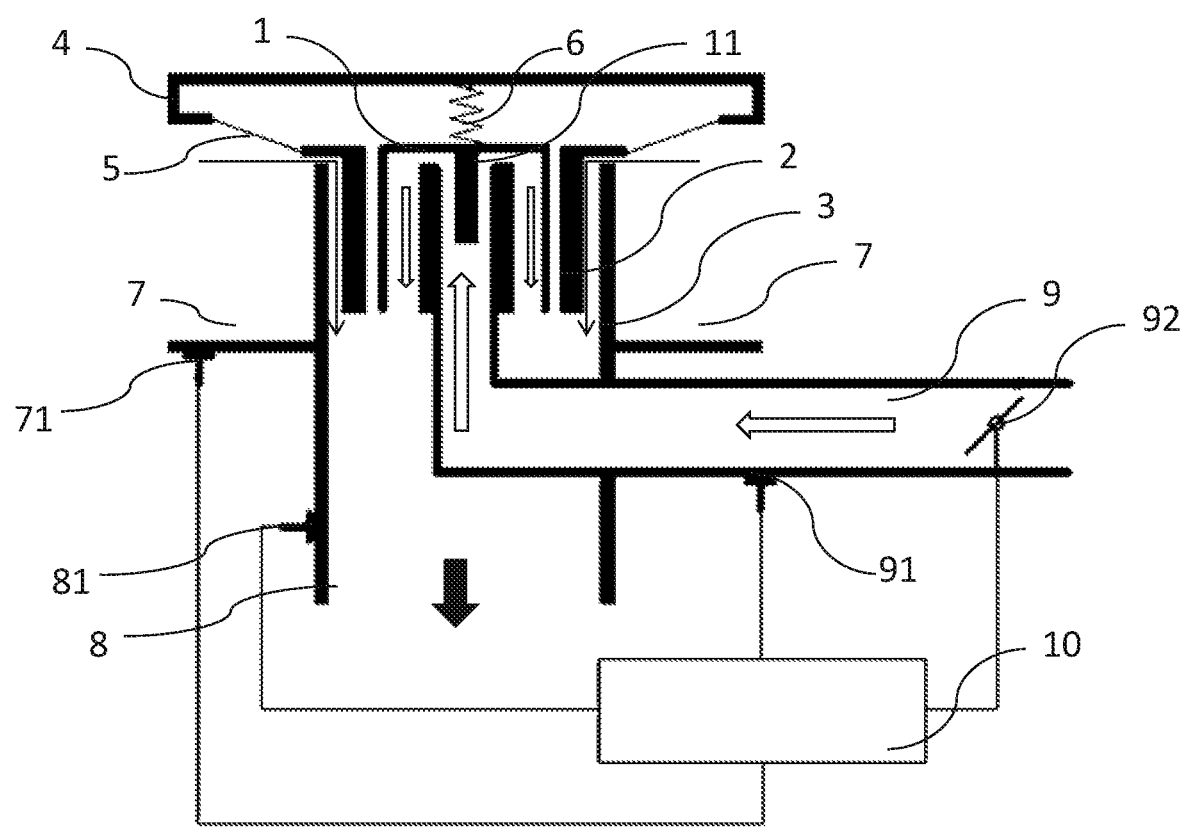
FIG. 1 is a schematic structural view of a gas control system for a non-road gas engine according to the present disclosure.

1: inner core; 11: guide post
2: sleeve
3: casing
4: upper cover
5: diaphragm
6: spring
7: air inlet; 71: first pressure sensor
8: mixed gas outlet; 81: third pressure sensor
9: gas inlet; 91: second pressure sensor; 92: pressure regulating valve
10: controller

DETAILED DESCRIPTION

Exemplary embodiments of the present disclosure are described in detail below with reference to the drawings. Although the exemplary embodiments of the present disclosure are shown in the drawings, it should be understood that the present disclosure can be implemented in various forms and should not be limited to the embodiments set forth herein. Rather, these embodiments are provided so that the present disclosure can be thoroughly understood and the scope of the present disclosure can be fully conveyed to those skilled in the art.

Refer is made to FIG. 1, which is a schematic structural view of a gas control system for a non-road gas engine according to the present disclosure.

In a specific embodiment, the gas control system for the non-road gas engine according to the present disclosure includes a mixer which is provided with an air inlet 7, a gas inlet 9 and a mixed gas outlet 8 respectively. The air inlet 7 is provided with a first pressure sensor 71, the gas inlet 9 is provided with a second pressure sensor 91 and a pressure regulating valve 92 that are spaced apart, and the mixed gas outlet 8 is provided with a third pressure sensor 81. The first pressure sensor 71, the second pressure sensor 72, the pressure regulating valve 92 and the third pressure sensor 81 are respectively electrically connected to a controller 10, and the controller 10 controls an opening degree of the pressure regulating valve 92 according to pressure information fed back by the first pressure sensor 71, the second sensor 91 and the third pressure sensor 81 so as to adjust an air-gas ratio of the mixed gas. The mixer is provided with an air inlet 7, a gas inlet 9 and a mixed gas outlet 8 respectively. The air and the gas enter the mixer through the air inlet 7 and the gas inlet 9 respectively. After the air and the gas are mixed in the mixer, a mixed gas enters the engine through the mixed gas outlet 8. The first pressure sensor 71 is disposed at the air inlet 7 for detecting the pressure of the air entering the mixer in real time, the second pressure sensor 91 is disposed at the gas inlet 9 for detecting the pressure of the gas entering the mixer in real time, and the third pressure sensor 81 is disposed at the mixed gas outlet 8 for detecting the pressure of the mixed gas in real time. The pressure regulating valve 92 is further disposed at the gas inlet 9, and the second pressure sensor 91 is located between the pressure regulating valve 92 and the gas inlet 9.

During use, the first pressure sensor 71, the second pressure sensor 91 and the third pressure sensor 81 detect the pressures at the air inlet 7, the gas inlet 9, and the mixed gas outlet 8 respectively, and the pressures at the above three positions are transmitted to the controller 10. When the air-gas ratio needs to be adjusted according to the actual working condition, the controller 10 determines the required pressure at the gas inlet 9 by calculating based on the pressures at the above three positions. The controller 10 adjusts the opening degree of the pressure regulating valve 92 so that the pressure of the gas entering the gas inlet 9 meets the usage requirements under the current working condition, thereby achieving the adjustment of the air-gas ratio. In FIG. 1, thin-solid-line arrows indicate a flow direction of the air, hollow arrows indicate a flow direction of the gas, and thick black arrows indicate a flow direction of the mixed gas.

The system has a simple structure and low manufacturing cost. By adjusting the pressure regulating valve 92 disposed at the gas inlet 9, the pressure of the gas entering the mixer is controlled, thereby controlling the required air-gas ratios under various working conditions and realizing a closed-loop control so that a control range of the air-gas ratio is smaller, the accuracy is higher, and a transient response speed of the engine is improved.

It should be noted that the controller 10 performs the calculation by using the following formula during the calculation process:

The current gas flow rate is calculated by the following formula:

$$Q_{gas} = C_{gas} \times L_{gas} \times h \times \sqrt{\frac{(P_{gas} - P_{mix})}{\rho_{gas}}}$$

where $Q_{gas}$ is the gas flow rate, $C_{gas}$ is a structural constant, $L_{gas}$ is a radial section circumference of the gas passage, h is an intake displacement, $P_{gas}$ is the current pressure of the gas, $P_{mix}$ is the current pressure of the mixed gas, and $\rho_{gas}$ is the gas density.

The current air flow rate is calculated by the following formula:

$$Q_{air} = C_{air} \times L_{air} \times h \times \sqrt{\frac{(P_{air} - P_{mix})}{\rho_{air}}}$$

where $Q_{air}$ is the air flow rate, $C_{air}$ is a structural constant, $L_{air}$ is a radial section circumference of the air passage, h is an intake displacement, $P_{air}$ is the current pressure of the air, $P_{mix}$ is the current pressure of the mixed gas, and $\rho_{air}$ is the air density.

The current air-gas ratio is calculated by the following formula:

$$\frac{Q_{air}}{Q_{gas}} = \frac{C_{air} \times L_{air}}{C_{gas} \times L_{gas}} \times \sqrt{\frac{(P_{air} - P_{mix})}{\rho_{air}} \times \frac{\rho_{gas}}{(P_{gas} - P_{mix})}}$$

It can be derived that the pressure of the gas is calculated by the following formula:

$$P_{gas} = P_{mix} + \frac{\rho_{gas}(P_{air} - P_{mix})}{\rho_{air}\left(\frac{Q_{air}}{Q_{gas}} \times \frac{C_{gas} \times L_{gas}}{C_{air} \times L_{air}}\right)^2}$$

It can be known from the above formulas that each of $C_{air}$, $L_{air}$, $C_{gas}$ and $L_{gas}$ is determined by internal structural parameters of the mixer. Through CFD simulation and optimization, it is achieved that they do not change with the change of h. Moreover, $\rho_{air}$ and $\rho_{gas}$ are constants, so the air-gas ratio $Q_{air}/Q_{gas}$ only depends on $P_{gas}$, $P_{air}$ and $P_{mix}$. Given the $P_{air}$ and $P_{mix}$, the air-gas ratio can be adjusted by merely adjusting $P_{gas}$. By inputting the air-gas ratio under actual working condition into the formula, the currently required gas pressure can be obtained, and the current air-gas ratio can be made meet the requirement of the air-gas ratio under actual working condition according to the currently required gas pressure.

After the currently required gas pressure is calculated, the controller 10 controls the opening degree of the pressure regulating valve 92 so that the gas is input according to the currently required gas pressure, and that the air-gas ratio effectively meets the requirement of the current working condition, thereby improving the transient response speed of the engine.

It is further understood that the second pressure sensor 91 is located between the gas inlet 9 and the pressure regulating valve 92. The second pressure sensor 91 is disposed close to the interior of the mixer. By disposing the second pressure sensor 91 at this position, a real-time detection of the gas pressure at the rear end of the pressure regulating valve 92 (a connection end with the gas inlet 9) can be achieved, so that the accuracy of pressure detection at the gas inlet 9 is ensured, which provides a basis for accurately controlling the air-gas ratio and further improves the accuracy in adjusting the air-gas ratio.

Further, a gas passage, an air passage, a pressure transmission passage, a mixing chamber, and a working chamber are disposed in the mixer. The gas passage is in communication with the gas inlet 9 and the mixing chamber respectively, and the air passage is in communication with the air inlet 7 and the mixing chamber respectively. One end of the mixing chamber is in communication with the mixed gas outlet 8, and the other end of the mixing chamber is in communication with the working chamber through the pressure transmission passage. The pressure transmission passage is capable of transmitting a pressure difference at the mixed gas outlet 8 to the working chamber, and a movement of the working chamber enables the air inlet 7 and the gas inlet 9 to be opened so that gas and air are drawn into the mixing chamber. In the above structure, the air passage, the gas passage, and the pressure transmission passage are respectively disposed in the mixer, and the working chamber and the mixing chamber are further disposed in the mixer. The air passage and the gas passage are in communication with the mixing chamber respectively, which facilitates the air and the gas in entering the mixing chamber for mixing. The working chamber and the mixing chamber are in communication with each other through the pressure transmission passage. During operation, the engine is started, a negative pressure is generated at the mixed gas outlet 8 and is transmitted to the working chamber through the pressure transmission passage. The working chamber moves under the action of negative pressure and an external pressure. At this point, the volume of the working chamber becomes larger, whereby throats at the gas inlet 9 and the air inlet 7 are opened, and the gas and the air enter the mixing chamber. After the gas and the air are sufficiently mixed, the mixed gas enters the engine through the mixed gas outlet 8. The structure is simple and fully utilizes the principle of atmospheric pressure to realize the drawing and mixing of air and gas, thereby effectively improving the transient response speed of the engine.

Further, the mixer includes an inner core 1 having an open end facing the mixed gas outlet 8, wherein the open end is internally provided with a guide post 11 which is coaxially disposed with the inner core 1, the guide post 1 is coaxially inserted into a gas pipe, and the gas pipe is spaced apart from an outer wall of the guide post 11 and an inner wall of the inner core 1 respectively to form the gas passage. The gas passage is disposed on the axis of the inner core 1, and introduction of the gas is realized by the gas passage formed between a port of the gas pipe and the inner wall of the inner core 1, as well as between the outer wall of the gas pipe and the inner wall of the inner core 1. At this point, the gas is introduced from a central position of the mixer, and the gas is uniformly dispersed in the mixing chamber by a flow guiding effect of the guide post 11 and an inner end face of the inner core 1 during the entering process, so that the mixing effect of the air and gas is better and the accuracy of the air-gas ratio is improved.

Further, a sleeve 2 is sleeved over the inner core 1, the sleeve 2 is coaxially disposed with the inner core 1, a length of the sleeve 2 is equal to a length of the inner core 1, and an inner wall of the sleeve 2 is spaced apart from an outer wall of the inner core 1 so that the pressure transmission passage is formed. In the above structure, the sleeve 2 is coaxially sleeved over the outside of the inner core 1, the inner wall of the sleeve 2 is spaced apart from the outer wall of the inner core 1, and an annular gap formed between the two is the pressure transmission passage. This structure enables the pressure transmitted from the pressure transmission passage to the working chamber to be more uniform, which avoids the phenomenon of uneven pressure in the working chamber caused by pressure concentration, and thereby ensures the uniformity of the movement of the working chamber and guaranteeing the air intake effect.

Further, an end face of the sleeve 2 away from the mixed gas outlet 8 is connected with an upper cover 4 through an elastic assembly, and the elastic assembly includes a diaphragm 5 and a spring 6; one end of the diaphragm 5 is annularly connected to the end face of the sleeve 2 away from the mixed gas outlet 8, the other end of the diaphragm 5 is annularly connected to an end face of the upper cover 4, and the working chamber is formed by the sleeve 2, the diaphragm 5 and the upper cover 4; one end of the spring 6 is fixedly connected to the upper cover 4, the other end of the spring 6 is fixedly connected to the sleeve 2, and the spring 6 is coaxially disposed with the sleeve 2. In the above structure, the diaphragm 5 is a flexible structure. The upper cover 4 is connected to the sleeve 2 through the diaphragm 5. The upper cover 4 is provided with a cavity having an open end. The diameter of the open end is larger than the diameter of the sleeve 2. The upper cover 4 and the sleeve 2 are coaxially disposed and spaced apart. The diaphragm 5 has a tapered structure. A large end of the tapered structure is connected to the open end, and a small end of the tapered structure is connected to the sleeve 2. The sleeve 2, the diaphragm 5 and the upper cover 4 form the working chamber, wherein the spring 6 is coaxially disposed with the upper cover 4 and the sleeve 2 respectively, one end of the spring 6 is fixedly connected to the upper cover 4, and the other end is fixedly connected to the sleeve 2.

During operation of this structure, the engine is started, a negative pressure is generated at the mixed gas outlet 8 and is transmitted to the working chamber through the pressure transmission passage. A pressure difference between the air and the working chamber acts on the diaphragm 5, so that the diaphragm 5 is deformed. The diaphragm 5 moves upwards against the gravity and resistance of the spring 6 so that the upper cover 4 moves away from the sleeve 2 and the volume of the working chamber becomes larger, thereby opening the throats at the gas inlet 9 and the air inlet 7 to allow the gas and the air to enter the mixing chamber. After the gas and the air are sufficiently mixed, a mixed gas enters the engine through the mixed gas outlet 8. When the pressure difference between the inside and outside of the working chamber is cancelled, the upper cover 4 returns to an original position under the action of the spring 6.

It is specifically understood that a casing 3 is sleeved over an outer portion of the sleeve 2, the casing 3 is coaxially disposed with the sleeve 2, and an inner wall of the casing 3 is spaced apart from an outer wall of the sleeve 2 so that the air passage is formed; a length of the casing 3 is greater than a length of the inner core 1, the mixed gas outlet 8 is disposed at a port of the casing 3 away from the inner core 1, and the mixing chamber is located between the inner core 1 and the mixed gas outlet 8. In the above structure, the edge of the sleeve 2 is of a bent structure, an end face of the casing 3 is spaced apart from the bent structure, and the inner wall of the casing 3 is spaced apart from the outer wall of the mixer to form the air passage. The air passage is of an annular structure, air enters the mixing chamber through the air passage so that the air is more uniformly distributed inside the mixing chamber, and that the mixing density of the air and gas is uniform, which effectively improves the accuracy of the air-gas ratio. At the same time, the mixing chamber is disposed inside the casing, and is formed by the geometric structure between the casing 3 and the inner core 1. On one hand, an effective mixing of the air and gas can be achieved and the accuracy of the air-gas ratio can be ensured; on the other hand, the structure is made compact, and the manufacturing cost and an installation space are decreased.

Figure 2:
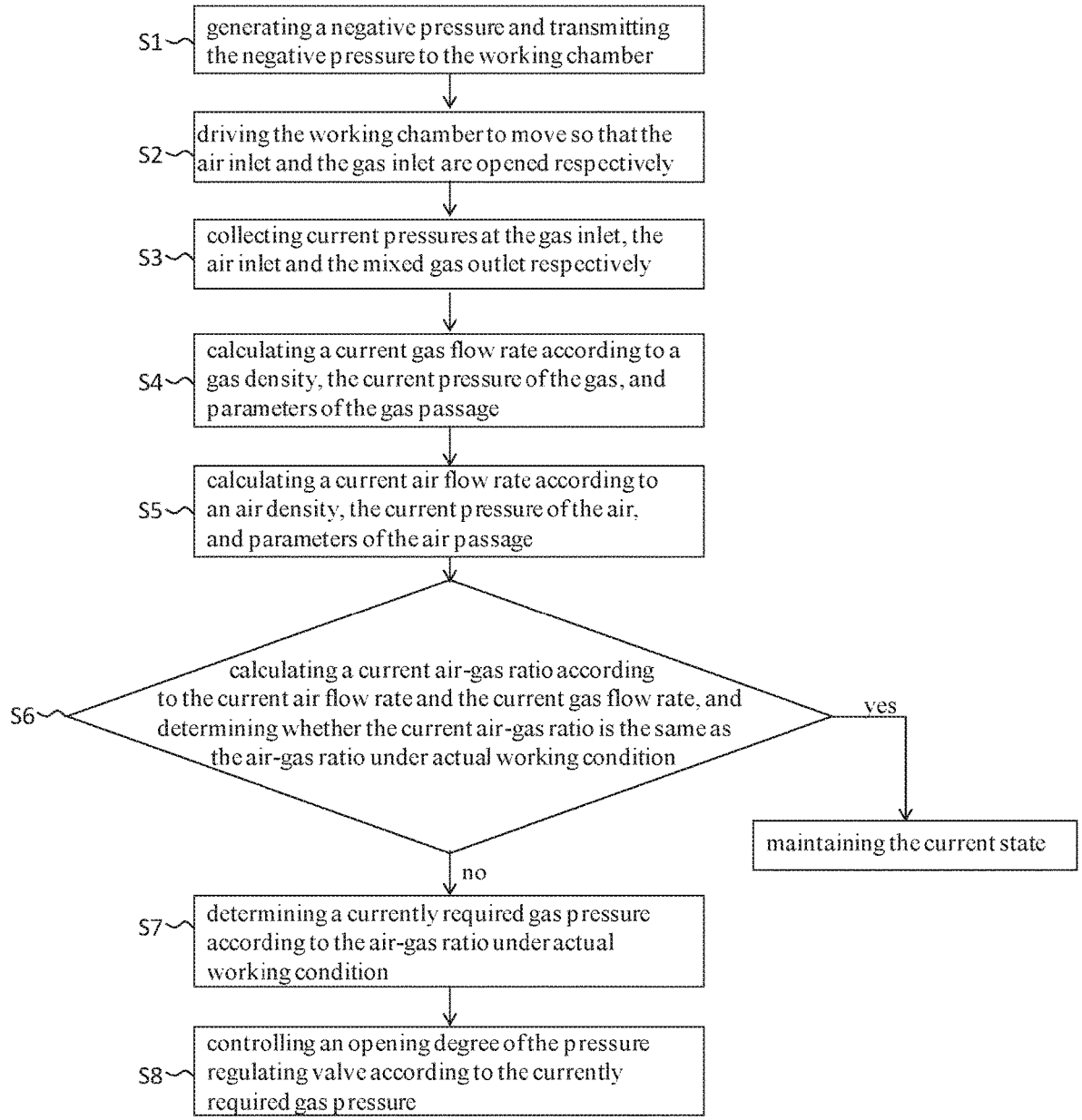
FIG. 2 is a flow chart of a gas control method for a non-road gas engine according to the present disclosure.

Reference is made to FIGS. 1 and 2, wherein FIG. 2 is a flow chart of a gas control method for a non-road gas engine according to the present disclosure.

The present disclosure also provides a gas control method for a non-road gas engine, which is implemented by the above described gas control system and includes the following steps:

S1: generating a negative pressure and transmitting the negative pressure to the working chamber; during the operation of the engine, a negative pressure is generated at the mixed gas outlet 8 due to an air intake operation so that the air and the gas are introduced, and energy consumption in the air and gas intake process is avoided.

S2: driving the working chamber to move so that the air inlet 7 and the gas inlet 9 are opened respectively; the upper cover 4 of the working chamber moves in a direction away from the sleeve 2 so that an internal volume of the working chamber is increased, and that the internal pressure of the working chamber is less than the external atmospheric pressure, thereby effectively realizing automatic air and gas intake operation.

S3: collecting current pressures at the gas inlet 9, the air inlet 7 and the mixed gas outlet 8 respectively; the first pressure sensor is disposed at the air inlet 7 for collecting the current pressure of the air, the second pressure sensor 91 is disposed at the gas inlet 9 for collecting the current pressure of the gas, and the third pressure sensor is disposed at the mixed gas outlet 8 for collecting the current pressure of the mixed gas.

S4: calculating a current gas flow rate according to a gas density, the current pressure of the gas, and parameters of the gas passage; wherein the current gas flow rate is calculated by the following formula:

$$Q_{gas} = C_{gas} \times L_{gas} \times h \times \sqrt{\frac{(P_{gas} - P_{mix})}{\rho_{gas}}}$$

where $Q_{gas}$ is the gas flow rate, $C_{gas}$ is a structural constant, $L_{gas}$ is a radial section circumference of the gas passage, h is an intake displacement, $P_{gas}$ is the current pressure of the gas, $P_{mix}$ is the current pressure of the mixed gas, and $\rho_{gas}$ is the gas density.

S5: calculating a current air flow rate according to an air density, the current pressure of the air, and parameters of the air passage; in step S5, the current air flow rate is calculated by the following formula:

$$Q_{air} = C_{air} \times L_{air} \times h \times \sqrt{\frac{(P_{air} - P_{mix})}{\rho_{air}}}$$

where $Q_{air}$ is the air flow rate, $C_{air}$ is a structural constant, $L_{air}$ is a radial section circumference of the air passage, h is an intake displacement, $P_{air}$ is the current pressure of the air, $P_{mix}$ is the current pressure of the mixed gas, and ρair is the air density.

S6: calculating a current air-gas ratio according to the current air flow rate and the current gas flow rate, and determining whether the current air-gas ratio is the same as the air-gas ratio under actual working condition; if yes, maintaining the current state; and if no, proceeding to S7.

S7: determining a currently required gas pressure according to the air-gas ratio under actual working condition; the current air-gas ratio is calculated by the following formula:

$$\frac{Q_{air}}{Q_{gas}} = \frac{C_{air} \times L_{air}}{C_{gas} \times L_{gas}} \times \sqrt{\frac{(P_{air} - P_{mix})}{\rho_{air}} \times \frac{\rho_{gas}}{(P_{gas} - P_{mix})}}$$

It can be derived that the pressure of the gas is calculated by the following formula:

$$P_{gas} = P_{mix} + \frac{\rho_{gas}(P_{air} - P_{mix})}{\rho_{air}\left(\frac{Q_{air}}{Q_{gas}} \times \frac{C_{gas} \times L_{gas}}{C_{air} \times L_{air}}\right)^2}$$

It can be known from the above formulas that each of $C_{air}$, $L_{air}$, $C_{gas}$ and $L_{gas}$ is determined by internal structural parameters of the mixer. Through CFD simulation and optimization, it is achieved that they do not change with the change of h. Moreover, ρair and ρgas are constants, so the air-gas ratio Qair/Qgas only depends on $P_{gas}$, $P_{air}$ and $P_{mix}$. Given the $P_{air}$ and $P_{mix}$, the air-gas ratio can be adjusted by merely adjusting $P_{gas}$. By inputting the air-gas ratio under actual working condition into the formula, the currently required gas pressure can be obtained, and the current air-gas ratio can be made meet the requirement of the air-gas ratio under actual working condition according to the currently required gas pressure.

S8: controlling an opening degree of the pressure regulating valve 92 according to the currently required gas pressure.

As compared with the related art, the gas control system and the gas control method for the non-road gas engine provided by the present disclosure have the following advantageous effects:

1. Under the premise that the current pressure of the air and the current pressure of the mixed gas are measured, the pressure of the gas entering the mixer is controlled by adjusting the pressure regulating valve disposed at the gas inlet, thereby controlling the air-gas ratios required under various working conditions and realizing a closed-loop control so that a control range of the air-gas ratio is smaller and the accuracy is higher.

2. The air-gas ratio of the mixer can be automatically adjusted according to a transient working condition of the engine to improve a transient response speed of the engine.

3. The structure is simple, and the manufacturing cost can be effectively reduced; at the same time, the performance is good, and the control accuracy is high.

It should be understood that, although terms such as first, second, third and the like may be used herein to describe a plurality of elements, components, regions, layers and/or sections, these elements, components, regions, layers and/or sections should not be limited by these terms. These terms may be used only to distinguish one element, component, region, layer or section from another element, component, region, layer or section. Unless explicitly indicated in the context, terms such as "first", "second" and other numerical terms used herein do not imply a sequence or order.

Described above are only preferred embodiments of the present application. However, the scope of protection of the present application is not limited thereto. Changes or alternatives that can be easily conceived by those skilled in the art within the technical scope disclosed in the present application will fall within the scope of protection of the present application. Therefore, the scope of protection of the present application shall be accorded in line with the appended claims.

The invention claimed is:

1. A gas control system for a non-road gas engine, comprising a mixer provided with an air inlet, a gas inlet and a mixed gas outlet respectively, wherein the air inlet is provided with a first pressure sensor, the gas inlet is provided with a second pressure sensor and a pressure regulating valve that are spaced apart, and the mixed gas outlet is provided with a third pressure sensor; and the first pressure sensor, the second pressure sensor, the pressure regulating valve and the third pressure sensor are respectively electrically connected to a controller, and the controller controls an opening degree of the pressure regulating valve according to pressure information fed back by the first pressure sensor, the second pressure sensor and the third pressure sensor so as to adjust an air-gas ratio of the mixed gas, wherein the mixer is provided therein with a gas passage, an air passage, a pressure transmission passage, a mixing chamber and a working chamber, the gas passage is in communication with the gas inlet and the mixing chamber respectively, the air passage is in communication with the air inlet and the mixing chamber respectively, one end of the mixing chamber is in communication with the mixed gas outlet, and the other end of the mixing chamber is in communication with the working chamber via the pressure transmission passage; and the pressure transmission passage is capable of transmitting a pressure difference at the mixed gas outlet to the working chamber, wherein a movement of the working chamber enables the air inlet and the gas inlet to be opened so that gas and air are drawn into the mixing chamber.

2. The gas control system for a non-road gas engine according to claim 1, wherein the second pressure sensor is located between the gas inlet and the pressure regulating valve.

3. The gas control system for a non-road gas engine according to claim 1, wherein the mixer comprises an inner core having an open end facing the mixed gas outlet, the open end is internally provided with a guide post which is coaxially disposed with the inner core, the guide post is coaxially inserted into a gas pipe, and the gas pipe is spaced apart from an outer wall of the guide post and an inner wall of the inner core respectively to form the gas passage.

4. The gas control system for a non-road gas engine according to claim 3, wherein a sleeve is sleeved over the inner core, the sleeve is coaxially disposed with the inner core, a length of the sleeve is equal to a length of the inner core, and an inner wall of the sleeve is spaced apart from an outer wall of the inner core so that the pressure transmission passage is formed.

5. The gas control system for a non-road gas engine according to claim 4, wherein an end face of the sleeve away from the mixed gas outlet is connected with an upper cover through an elastic assembly, and the elastic assembly comprises a diaphragm and a spring;

one end of the diaphragm is annularly connected to the end face of the sleeve away from the mixed gas outlet, the other end of the diaphragm is annularly connected to an end face of the upper cover, and the working chamber is formed by the sleeve, the diaphragm and the upper cover; and one end of the spring is fixedly connected to the upper cover, the other end of the spring is fixedly connected to the sleeve, and the spring is coaxially disposed with the sleeve.

6. The gas control system for a non-road gas engine according to claim 5, wherein a casing is sleeved over an outer portion of the sleeve, the casing is coaxially disposed with the sleeve, and an inner wall of the casing is spaced apart from an outer wall of the sleeve so that the air passage is formed; and a length of the casing is greater than a length of the inner core, the mixed gas outlet is disposed at a port of the casing away from the inner core, and the mixing chamber is located between the inner core and the mixed gas outlet.

7. A gas control method for a non-road gas engine, which is implemented by the gas control system according to claim 1, wherein the gas control method comprises the following steps:

S1: generating a negative pressure and transmitting the negative pressure to the working chamber;

S2: driving the working chamber to move so that the air inlet and the gas inlet are opened respectively;

S3: collecting current pressures at the gas inlet, the air inlet and the mixed gas outlet respectively;

S4: calculating a current gas flow rate according to a gas density, the current pressure of the gas, and parameters of the gas passage;

S5: calculating a current air flow rate according to an air density, the current pressure of the air, and parameters of the air passage;

S6: calculating a current air-gas ratio according to the current air flow rate and the current gas flow rate, and determining whether the current air-gas ratio is the same as the air-gas ratio under actual working condition; if yes, maintaining the current state; and if no, proceeding to S7;

S7: determining a currently required gas pressure according to the air-gas ratio under actual working condition; and S8: controlling an opening degree of the pressure regulating valve according to the currently required gas pressure.

8. The gas control method for a non-road gas engine according to claim 7, wherein in step S4, the current gas flow rate is calculated by the following formula:

$$Q_{gas} = C_{gas} \times L_{gas} \times h \times \sqrt{\frac{(P_{gas} - P_{mix})}{\rho_{gas}}}$$

where $Q_{gas}$ is the gas flow rate, $C_{gas}$ is a structural constant, $L_{gas}$ is a radial section circumference of the gas passage, h is an intake displacement, $P_{gas}$ is the current pressure of the gas, $P_{mix}$ is the current pressure of the mixed gas, and $\rho_{gas}$ is the gas density; and in step S5, the current air flow rate is calculated by the following formula:

$$Q_{air} = C_{air} \times L_{air} \times h \times \sqrt{\frac{(P_{air} - P_{mix})}{\rho_{air}}}$$

where $Q_{air}$ is the air flow rate, $C_{air}$ is a structural constant, $L_{air}$ is a radial section circumference of the air passage, h is an intake displacement, $P_{air}$ is the current pressure of the air, $P_{mix}$ is the current pressure of the mixed gas, and $\rho_{air}$ is the air density.

9. The gas control method for a non-road gas engine according to claim 8, wherein in step S7, the current air-gas ratio is calculated by the following formula:

$$\frac{Q_{air}}{Q_{gas}} = \frac{C_{air} \times L_{air}}{C_{gas} \times L_{gas}} \times \sqrt{\frac{(P_{air} - P_{mix})}{\rho_{air}} \times \frac{\rho_{gas}}{(P_{gas} - P_{mix})}}$$

and it can be derived that the pressure of the gas is calculated by the following formula:

$$P_{gas} = P_{mix} + \frac{\rho_{gas}(P_{air} - P_{mix})}{\rho_{air}\left(\frac{Q_{air}}{Q_{gas}} \times \frac{C_{gas} \times L_{gas}}{C_{air} \times L_{air}}\right)^2}.$$

* * * * *